(No Model.) 4 Sheets—Sheet 1.
G. OSTEN.
SEEDING MACHINE.
No. 474,758. Patented May 10, 1892.
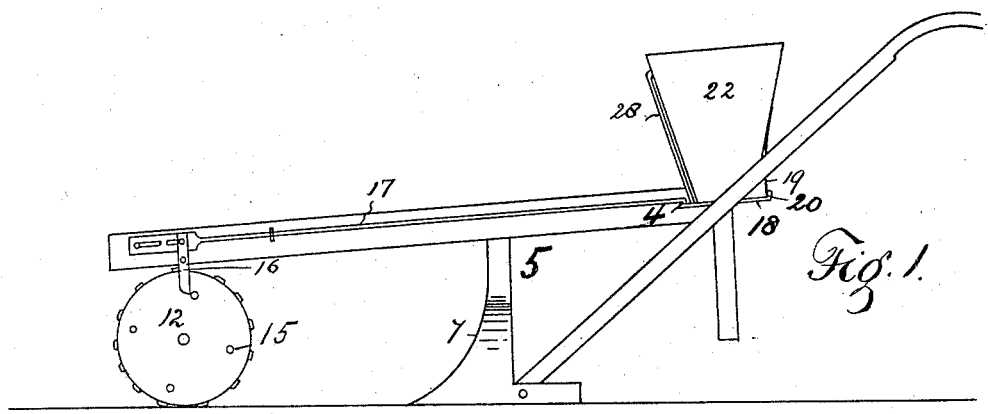
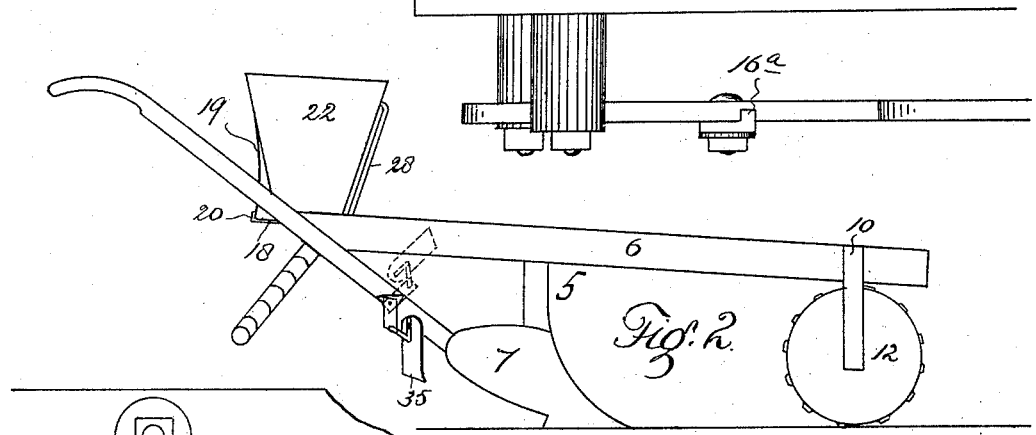
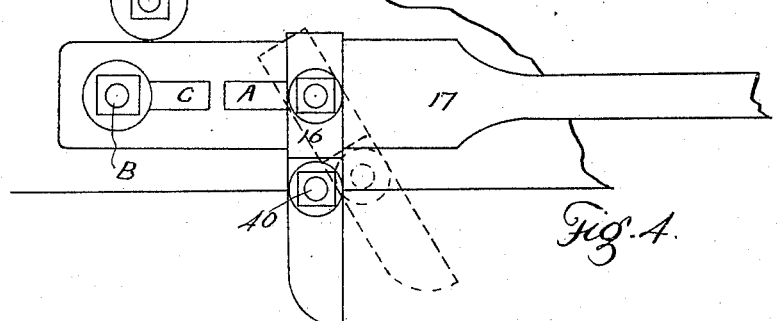

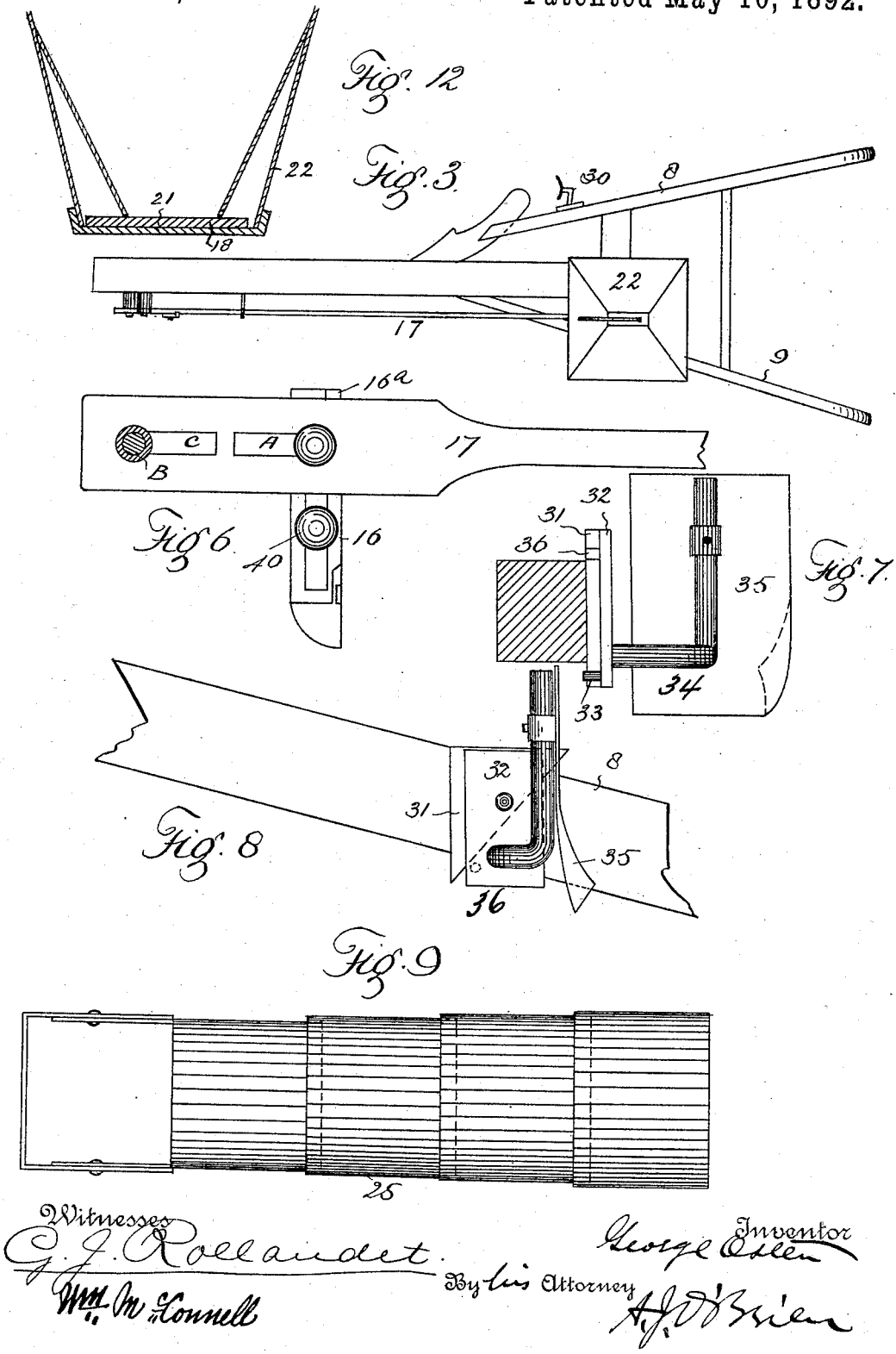

(No Model.)  4 Sheets—Sheet 3.

G. OSTEN.
SEEDING MACHINE.

No. 474,758.  Patented May 10, 1892.

(No Model.) 4 Sheets—Sheet 4.

G. OSTEN.
SEEDING MACHINE.

No. 474,758. Patented May 10, 1892.

THE NORRIS PETERS CO., PHOTO-LITHO., WASHINGTON, D. C.

UNITED STATES PATENT OFFICE.

GEORGE OSTEN, OF DENVER, COLORADO.

SEEDING-MACHINE.

SPECIFICATION forming part of Letters Patent No. 474,758, dated May 10, 1892.

Application filed August 27, 1891. Serial No. 403,918. (No model.)

*To all whom it may concern:*

Be it known that I, GEORGE OSTEN, a citizen of the United States of America, residing at Denver, in the county of Arapahoe and State of Colorado, have invented certain new and useful Improvements in Seeding Mechanism; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in seeding mechanism, and while more particularly designed for use as an attachment for plows and similar agricultural implements is not limited to this use, since it may be mounted upon a specially-constructed frame-work; or, in other words, a special seeder may be constructed embodying my improved mechanism.

The object of the improvement is to provide a suitable mechanism adapted to drop the seed at regular intervals, the device being both positive and automatic in action, reliable, durable, and effective in use, and at the same time economical in cost.

The improved device will be fully understood by reference to the accompanying drawings, in connection with the description hereinafter given.

Figure 11:
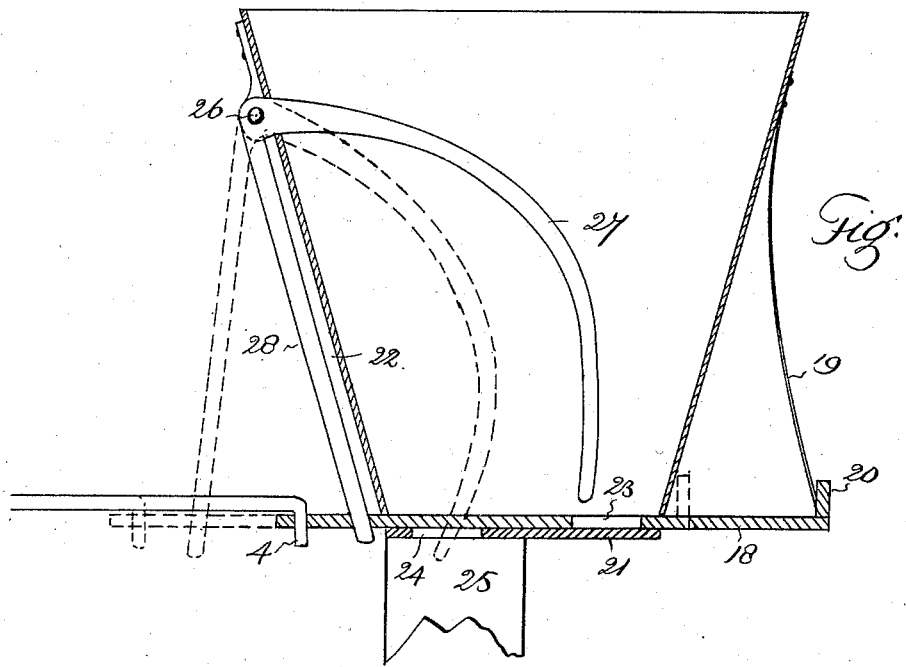
Figure 10:
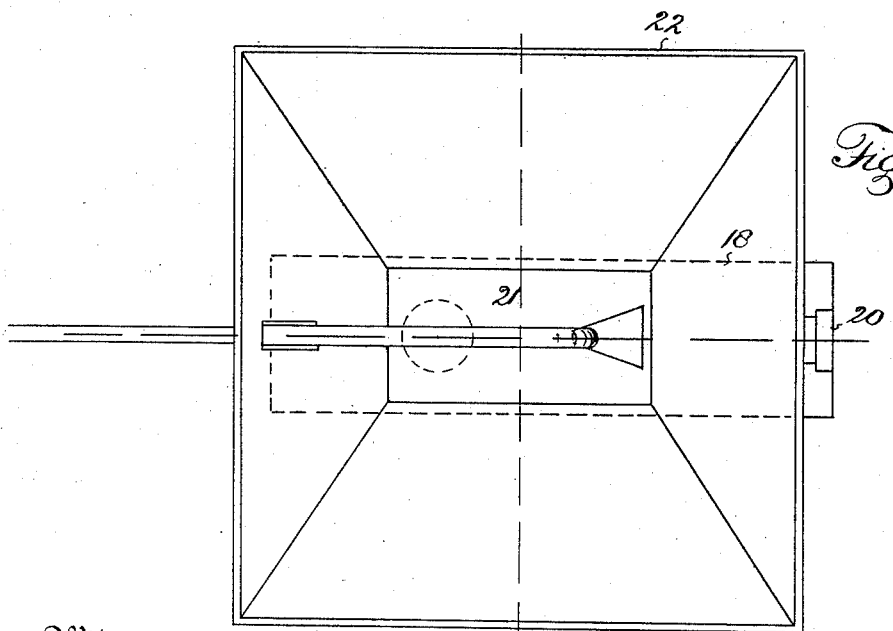
Figures 13, 14:
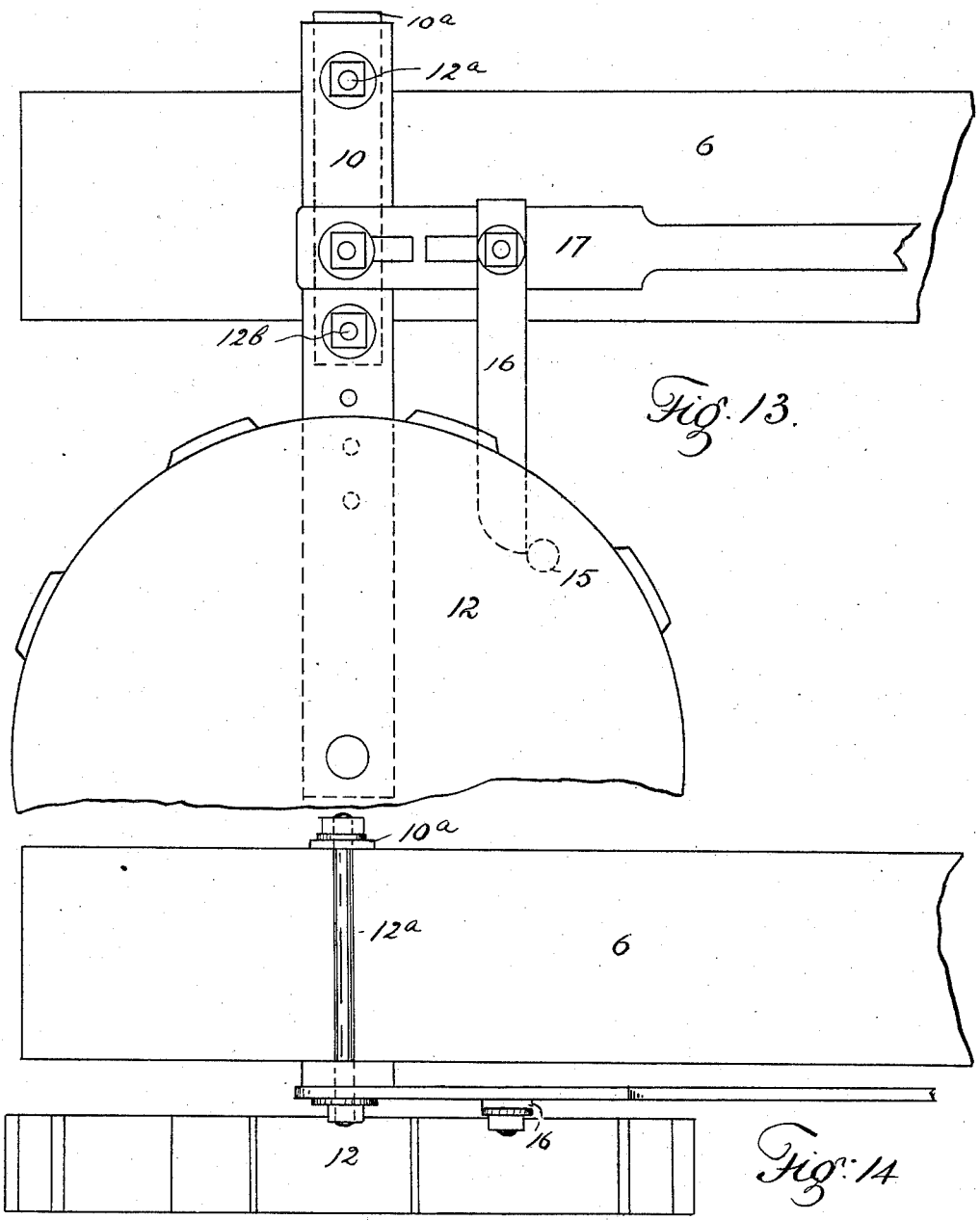

In the drawings, Figure 1 is a view of one side of a plow provided with my improved attachments; Fig. 2, a similar view of the opposite side of the plow; Fig. 3, a top or plan view of the same. Fig. 4 is a fragmentary side view, on an enlarged scale, of the forward part of the reciprocating rod and its attachments. Fig. 5 is a top view of the same. Fig. 6 is a side view of the forward portion of the reciprocating rod, showing the same detached from the plow-beam and the side opposite that shown in Fig. 4. Fig. 7 is a rear view, on an enlarged scale, of an adjustable attachment, which may be used in connection with the main features of my improved device. One of the plow-handles to which the attachment is secured is shown in section in this view. Fig. 8 is a side view, on a similar scale, of the attachment shown in the last-named figure. Fig. 9 is an enlarged side elevation of the adjustable guide-tube used in connection with the dropping mechanism. Fig. 10 is a top view, on an enlarged scale, of the hopper and connecting parts. Fig. 11 is a vertical section taken through the hopper on the line $x\ x$, Fig. 10. Fig. 12 is a vertical section taken through the hopper at right angles to the last-named section. Fig. 13 is a side elevation of a modified form of construction. Fig. 14 is a top or plan view of the same.

In the views, similar reference characters indicating corresponding parts or elements of the mechanism, let the numeral 5 indicate a plow of conventional construction, consisting of the beam 6, the share 7, and the handles 8 and 9.

To a suitable hanger 10, secured to the forward part of the beam, is journaled the wheel 12, of ordinary construction, except that it is provided with one or more pins 15, adapted to engage an adjustable hanger 16, secured to the reciprocating rod 17 near its forward extremity. The rear extremity of rod 17 is connected in any suitable manner with the movable seed-slide 18, as by a downwardly-turned projection 4, entering a suitable aperture formed in the forward extremity of the plate. Slide 18 is normally held at its backward limit of movement by a suitable spring 19, having its free extremity engaging an upwardly-projecting flange 20 of the slide, said flange being formed at its rear extremity. The movable slide 18 rests upon and is supported by the stationary bottom 21 of the hopper 22, adapted to receive the seed to be planted. This hopper is suitably supported upon the frame-work of the plow, being preferably located over the rear extremity of the beam and between the handles. In the bottom of this hopper is formed an opening 24, which is normally closed by the slide 18, which is, however, provided with an opening 23, which is placed in a position just above opening 24, when the slide is at its forward limit of movement and immediately before the reciprocating rod is released from the action of the pin 15 on wheel 12. When openings 23 and 24 coincide as to position, a continuous opening is formed from the interior of the hopper to the discharge-spout 25 and some of the seed drops from the hopper through this spout to the earth. The opening 24 may be of uniform size for planting all kinds of seeds; but the opening 23 should be comparatively large for coarse seed and smaller for seed having more diminutive kernels. Opening 24 is preferably circular in shape, as is also opening 23 when planting coarse kernels. When, however, it is desired to plant smaller seeds, the slide 18 with the larger opening should be replaced by another having a smaller aperture and preferably of triangular shape, as shown in full lines in Fig. 10.

To prevent the possibility of the seed clogging in the hopper, I employ an agitating device shaped after the manner of a bell-crank lever. This device is pivoted, as shown at 26, to a suitable lug formed on the outer front side of the hopper, and consists of a hook-shaped arm 27, passing through a suitable opening formed in the side of the hopper and extending into the chamber thereof and nearly to its bottom when the slide 18 is in the backward position. The other arm of this device lies outside of the hopper and projects through a suitable opening formed in plate 18 between the hopper and the connection of the plate with rod 17. It will thus be observed that as the slide moves forward at each reciprocation of the rod the agitating device is moved to the position shown by dotted lines in Fig. 11, the lower extremity of the device entering the aperture 24 and preventing the possibility of the clogging of the seed within the chamber of the hopper.

The discharge-spout 25 is adjustable and preferably of telescopic construction, as shown in Fig. 9. This spout should be deflected backward, as shown in Fig. 2, to prevent the possibility of any dirt getting into the lower opening, which might have a tendency to clog the spout or prevent the free discharge of the seed therefrom.

When my improved device is used in connection with a plow, as shown in the drawings, the intention is to drop the seed into the furrow as the plow moves along. If it is not desired to plant the seed to the entire depth of the furrow, an adjustable attachment 30 may be secured to the outer side of the handle 8 or the handle on the share side of the plow. This device is located in front of the seed box or hopper and in the rear of the share, and is designed to partially refill the furrow by returning part of the earth thrown out by the share. It will thus be observed that by the use of this attachment the seed may be deposited at any desired depth. A suitable mechanism for carrying out this feature of the invention is shown in the drawings and illustrated on a large scale in Figs. 7 and 8. To the handle 8 of the plow is secured a triangular strip 31, to which is adjustably secured a plate 32, provided with a wrist or projection 33. To plate 32 is secured one extremity of a bar 34 of angular shape. To this bar is secured a sort of blade or shovel 35 of suitable shape and adapted to engage the earth as it is thrown from the furrow and return enough to properly regulate the depth of depositing the seed.

When it is not desired to use the mechanism last described—as when plowing, for instance, simply to cover the seed—plate 32 may be turned upon its pivot, so as to throw part 35 from the operating position, the pin 33 entering a slot 36, formed in the upper part of the triangular plate, thus locking the device in the desired position.

The hanger 16, engaged by pins 15 of the wheel is formed in two parts and made adjustable, being connected by a nut and bolt 40. By loosening the nut on this bolt the lower part of the hanger may be moved upward or downward to suit the purpose, according as it is necessary that the pin 15 should engage the hanger a longer or shorter time. The hanger 16 is pivoted to the rod 17, the upper extremity of the hanger being provided with a lug $16^a$, projecting over the top of the rod and adapted to prevent the hanger from moving forward out of the vertical position. The hanger may, however, be moved backward out of engagement with the pins of the wheel when for any reason it is not desired that it should be engaged thereby. The pivotal bolt of the hanger passes through a slot A, formed in rod 17, so that the hanger may also be adjusted by moving it forward or backward in a longitudinal direction upon rod 17 for the purpose of causing a longer or shorter engagement with the pins of wheel 12. The forward extremity of rod 17 is supported and guided by a stationary bolt B, passing through the plow-beam and also through a slot C, formed in rod 17. Slot C is of sufficient length to give the proper stroke to this rod. Above the forward extremity of rod 17 is located a roller-bearing adapted to prevent the rod from moving upward and disengaging hanger 16 from the pins of the rotating wheel, as might be the case if the rod were not retained in place by a positive device of this character.

In the modified form of construction shown in Figs. 13 and 14 the forward extremity of rod 17 is secured directly to the hanger 10, supporting the wheel 12, said hanger being adjustable and secured to the beam by the two bolts $12^a$ and $12^b$, one being located above and the other beneath the beam 6. On the opposite side of the beam from the hanger 10 is a plate $10^a$, which, in connection with hanger 10, forms a means of clamping the hanger to the beam, the bolts $12^a$ and $12^b$ passing through suitable apertures formed both in the hanger and in the plate. The distance of the wheel from the beam may be adjusted by passing these bolts through other apertures formed in hanger 10. By the use of this construction the relative position of the parts 17, 12, and 16 is maintained, whatever may be the distance of the wheel from the beam, which distance must, of course, be regulated according to the depth it is desired to plow.

It will be seen from the foregoing construction that the seed may be regularly and accurately dropped at any intervals desired, and that it may be deposited to the depth of plowing the earth or to any less depth, as may be desired. It will be found particularly valuable in western country, where it is advantageous to plow the ground and plant the seed simultaneously and for the further reason that it is generally necessary to deposit the seed to a considerable depth in the earth to provide for lack of moisture.

Having thus described my invention, what I claim is—

1. The combination, in a seeder, of a supporting-frame and a hopper provided with an opening in the bottom, a reciprocating slide supported upon the bottom of the hopper and projecting therefrom both in front and in the rear, said slide being provided with an opening normally retained at one side of the opening within the hopper-bottom, a spring having a tendency to retain the slide in its normal position, a bar connected to the slide in front of the hopper and extending forward, its forward extremity being provided with a slot, a bolt attached to the frame and passing through the slot, whereby the bar is slidingly supported upon the frame, a hanger 16, pivoted on the bar and provided with a rearward lug 16ª, projecting over the top of the bar and maintaining the hanger in a perpendicular position when acted upon from the rear, but permitting it to be turned upon its pivot by a backward thrust, and a rotating wheel pivoted to a hanger secured to the frame and provided with one or more pins or lugs adapted to engage hanger 16 and impart a forward movement to the slide 18, substantially as and for the purpose set forth.

2. In a seeder, the combination, with a plow having a wheel on the beam adapted to roll upon the ground and provided with one or more pins, of a movable rod supported and guided upon the plow-beam and moved forward by the pins as the wheel rotates, a hopper supported upon the plow-frame in the rear and provided with an opening in the bottom and a movable slide, also provided with an opening, but normally located to one side of the opening in the hopper-bottom, a spring having a tendency to retain this slide in the normal position, the slide being suitably connected with the movable rod in front, a spout leading from the hopper, through which the seed passes to the earth, and means connected with the plow-frame for partially refilling the furrow to properly regulate the depth of depositing the seed, said means consisting of an adjustable blade or shovel attached to one of the plow-handles in the rear of the share and in front of the seed-dropping mechanism, substantially as described.

3. The combination, with a plow, of a hopper and seed-dropping mechanism supported thereon in the rear of the share, said mechanism being provided with a movable slide, and a spring normally retaining the slide at its backward limit of movement, a rigid longitudinal bar having its rear extremity connected with said slide, its forward extremity being slidingly supported upon the plow-beam and provided with a hanger, a wheel supported upon the plow-beam and provided with pins or projections engaging the lower extremity of the hanger and moving the bar forward in a direct line until the extremity of the hanger passes out of the arc in which the engaging-pin moves when the hanger is released, the hanger when engaged by the actuating-pin having no movement on its supporting-bar, substantially as described.

4. The combination, with a plow, of seed-dropping mechanism supported thereon in the rear of the share and provided with suitable means for actuating the same, consisting of a rigid longitudinally-movable bar connected at its rear extremity with said mechanism and having its forward extremity slidingly supported upon the plow-beam and provided with a hanger adjustable longitudinally on said bar and consisting of two parts, the upper part consisting of a plate pivoted on the bar and provided at its upper extremity with a rearward lug extending over the top of the bar, the lower part being adjustably secured to the upper part, whereby the length of the hanger may be regulated at will, and a wheel mounted upon the plow-beam and provided with pins adapted to engage the hanger as the wheel rotates and impart a forward movement to the bar and the seed-dropping mechanism actuated thereby, substantially as described.

5. The combination, with a plow, of seed-dropping mechanism supported thereon in the rear of the share and provided with suitable means for actuating the same, consisting of a rigid longitudinally-movable bar connected at its rear extremity with said mechanism and having its forward extremity slidingly supported upon the plow-beam and provided with a hanger adjustable vertically on itself and adjustable longitudinally on said bar, and a wheel mounted upon the plow-beam and provided with pins adapted to engage the hanger as the wheel rotates and impart a forward movement to the bar and the seed-dropping mechanism actuated thereby, substantially as described.

In testimony whereof I affix my signature in presence of two witnesses.

GEORGE OSTEN.

Witnesses:
 WM. MCCONNELL,
 G. J. ROLLANDET.